United States Patent [19]
Ohira et al.

[11] Patent Number: 4,642,713
[45] Date of Patent: Feb. 10, 1987

[54] HELICAL SCAN TYPE RECORDING AND/OR REPRODUCING APPARATUS

[75] Inventors: Tsunehisa Ohira, Sagamihara; Shinji Hirano, Tokyo; Koji Sadakane, Sagamihara, all of Japan

[73] Assignee: Victor Company of Japan, Ltd., Yokohama, Japan

[21] Appl. No.: 623,984

[22] Filed: Jun. 25, 1984

[30] Foreign Application Priority Data

Jul. 11, 1983 [JP] Japan ................. 58-125866

[51] Int. Cl.$^4$ ............................................. G11B 15/66
[52] U.S. Cl. ..................................................... 360/85
[58] Field of Search ..................................... 360/85, 95

[56] References Cited

U.S. PATENT DOCUMENTS 4,322,761 3/1982 Beitler et al. ........................ 360/85
4,520,411 5/1985 Ohshima ............................. 360/85

FOREIGN PATENT DOCUMENTS 356402 4/1980 Austria .
2730727 1/1979 Fed. Rep. of Germany .
2916895 10/1980 Fed. Rep. of Germany .
3104147 2/1982 Fed. Rep. of Germany .
3308110 9/1983 Fed. Rep. of Germany .

Primary Examiner—Robert S. Tupper
Attorney, Agent, or Firm—Ladas & Parry

[57] ABSTRACT

An automatic tape loading type recording and/or reproducing apparatus comprises a guide drum, a first loading mechanism for drawing a tape out of a loaded cassette and for guiding the tape by moving from an unloading position to a loading completion position on an entrance side of the guide drum in a tape moving direction, without changing a height position thereof which corresponds to a height position of a tape moving plane in which the tape moves within the cassette, a second loading mechanism for drawing the tape out of the cassette and for guiding the tape by moving from an unloading position to a loading completion position which is on an exit side of the guide drum in the tape moving direction and is in a plane lower than the tape moving plane, so that a height position of the tape on a downstream side of the second loading mechanism is restored to an original height position, and a tape guiding mechanism arranged on a downstream side of the second tape loading mechanism, for making contact with and guiding the tape having the restored height position by changing a moving direction of the tape to a direction along the tape moving plane. The tape is wrapped around the peripheral surface of the guide drum between the first and second loading mechanisms, over an angular range which greatly exceeds 180°.

10 Claims, 19 Drawing Figures

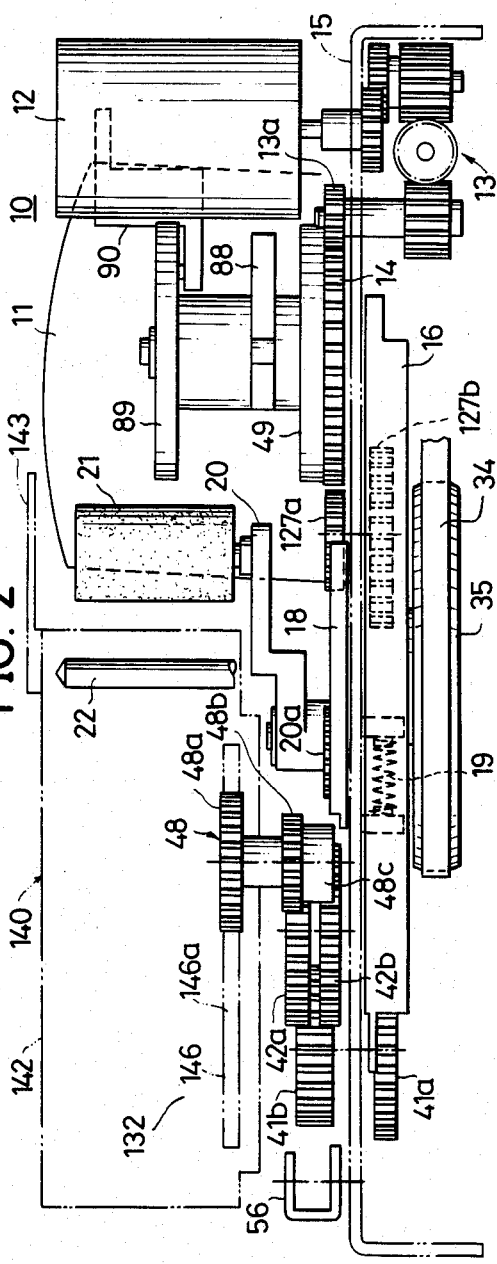
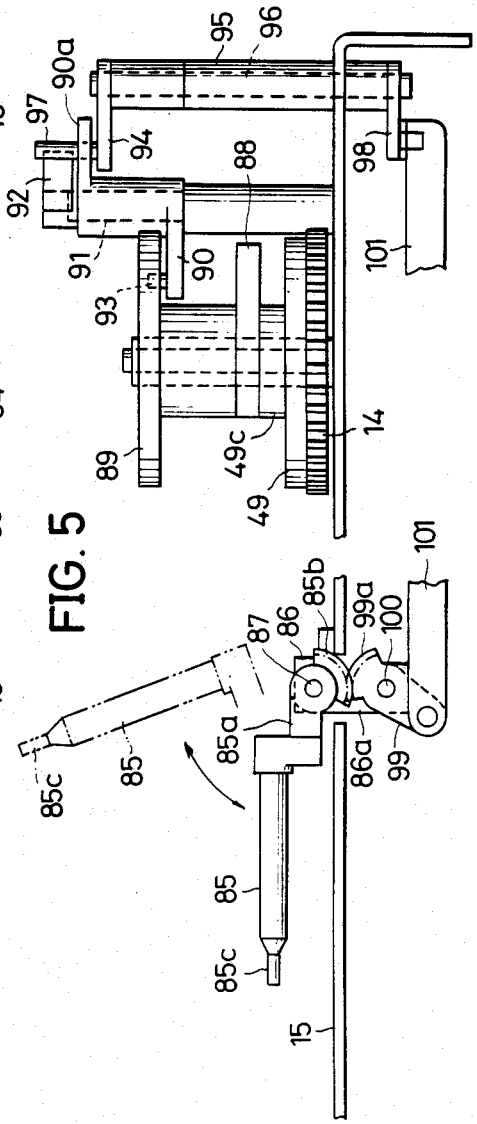
FIG. 2
FIG. 5

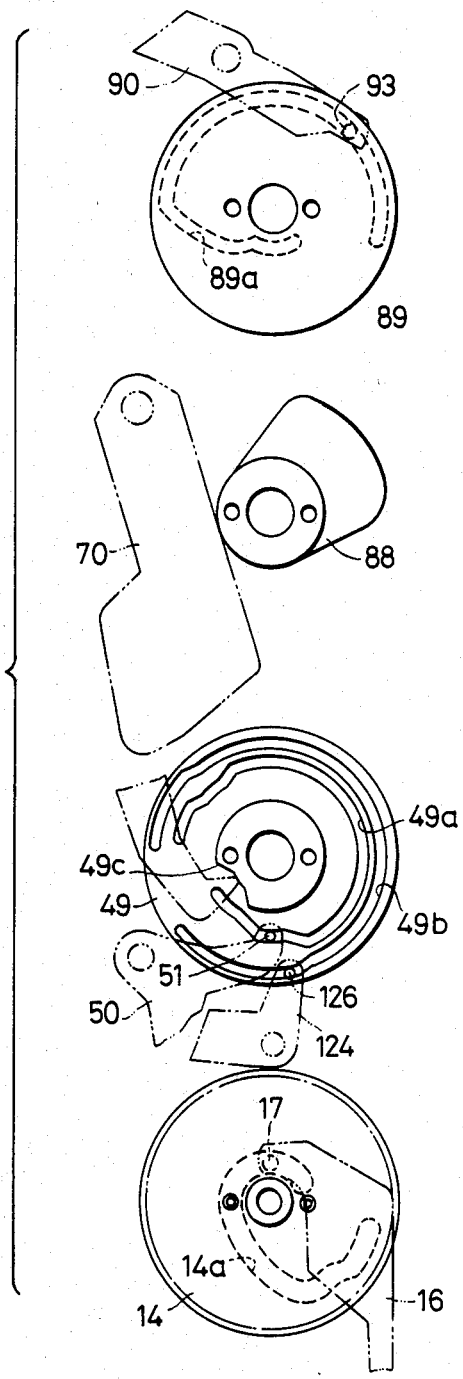

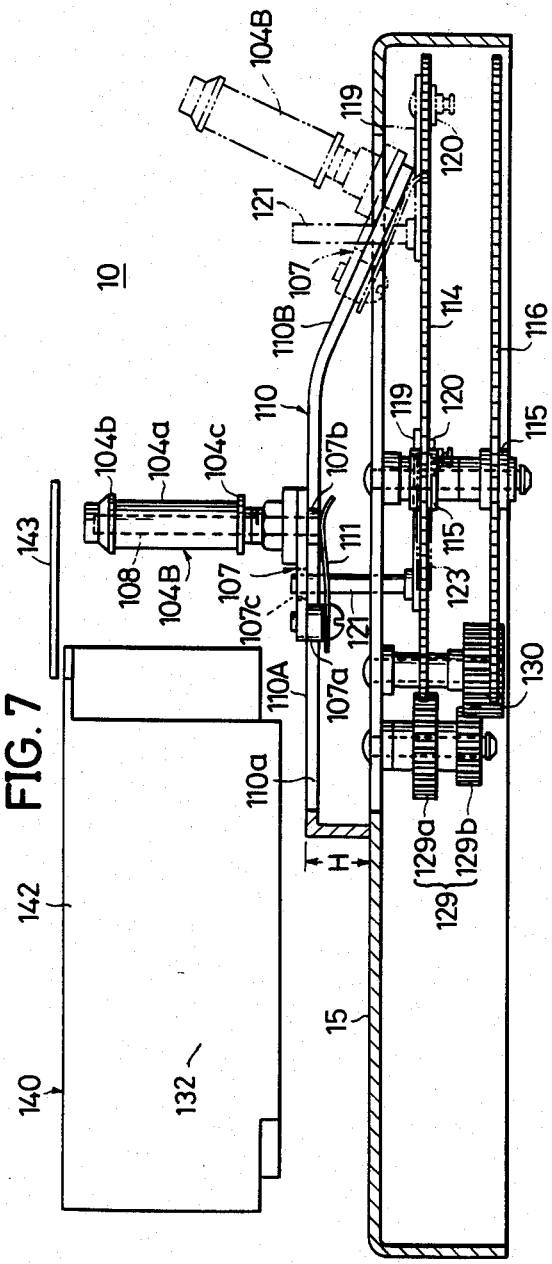
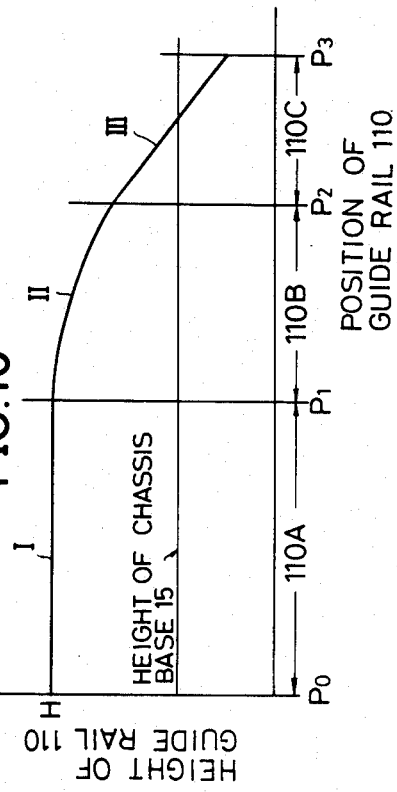

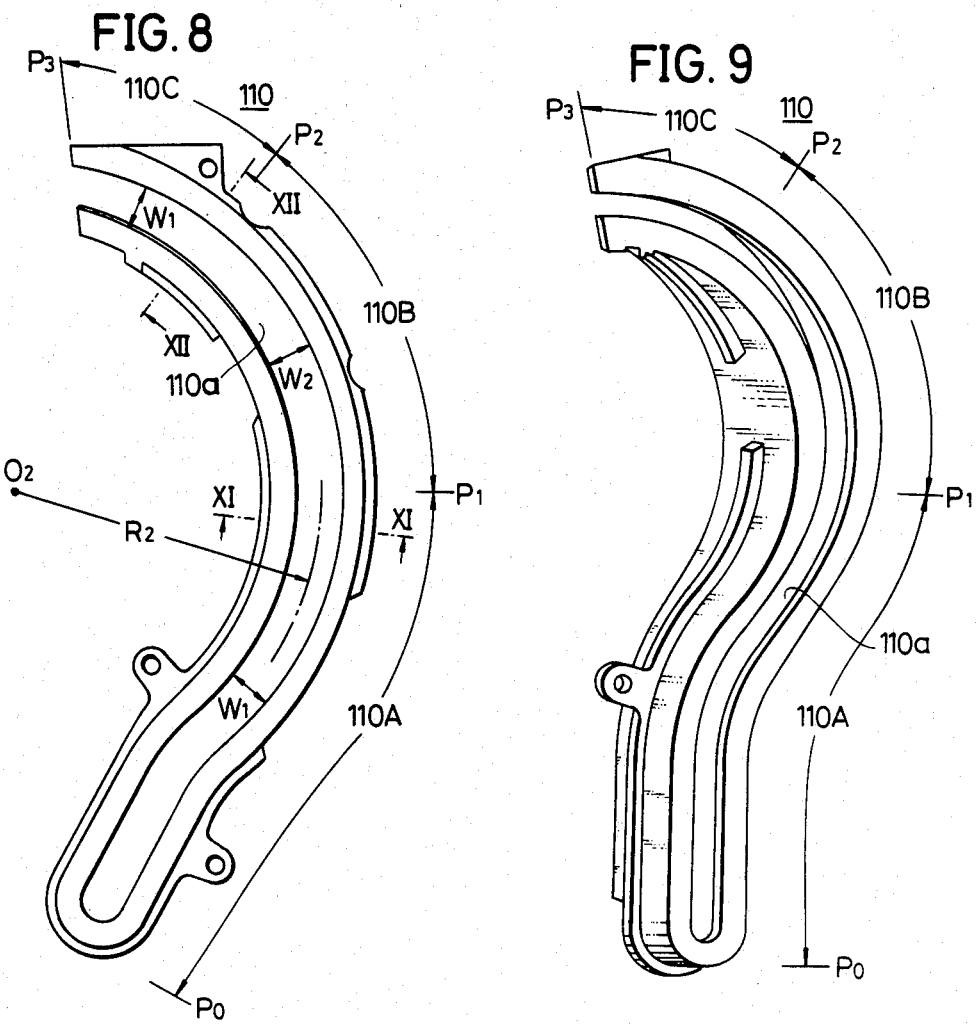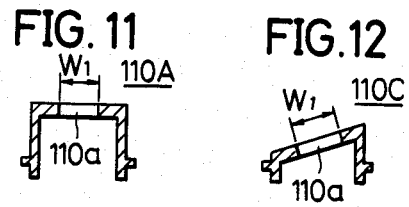

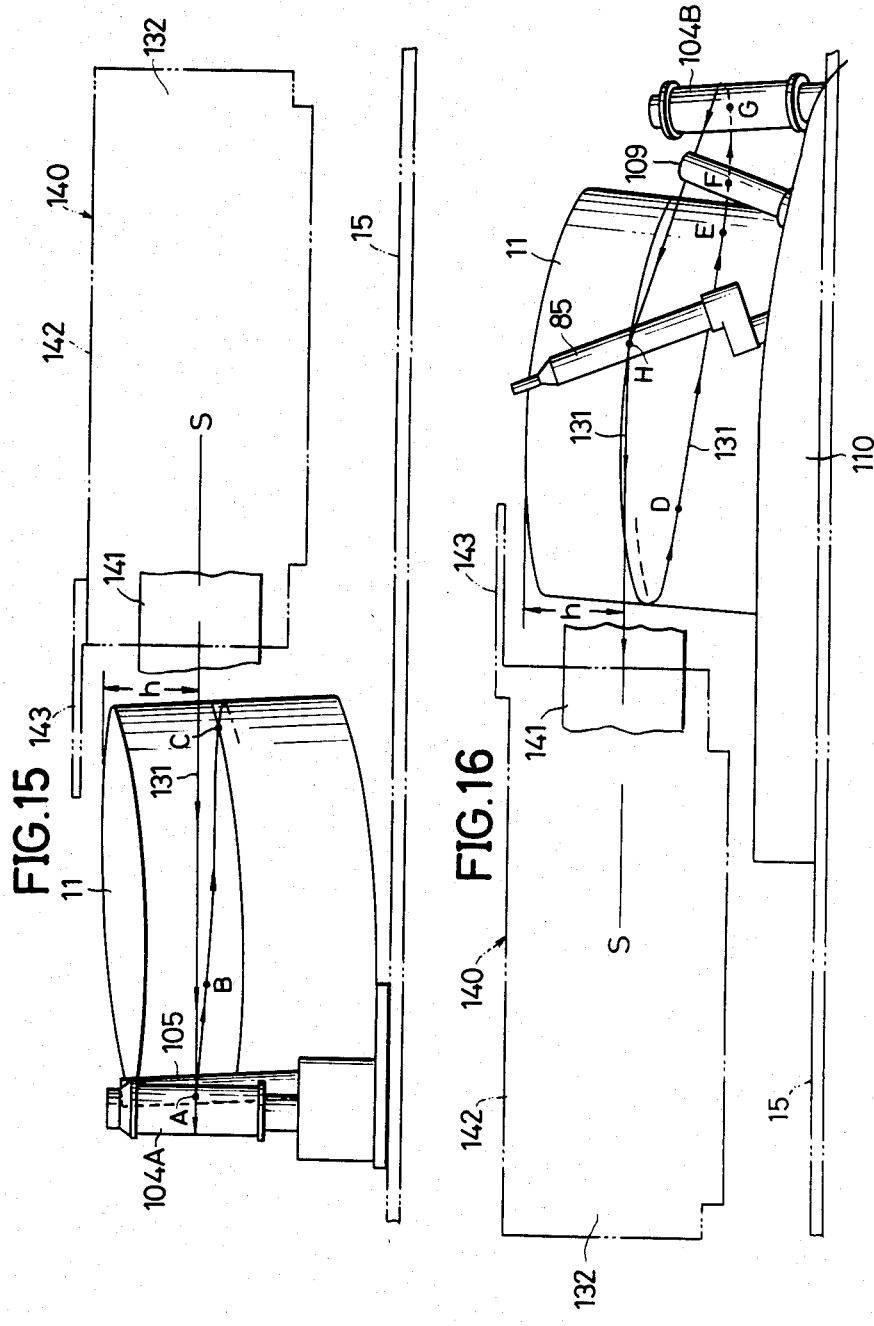

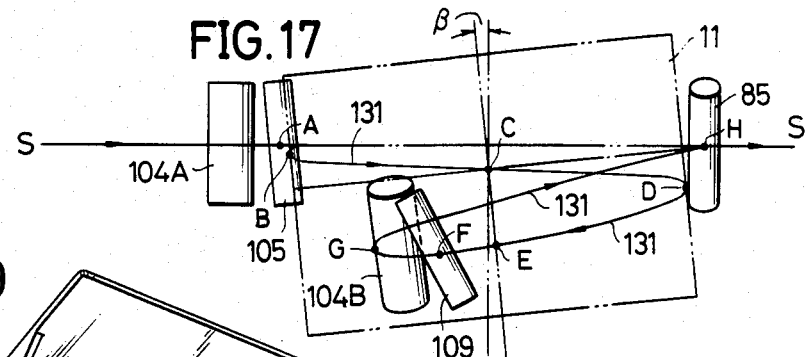
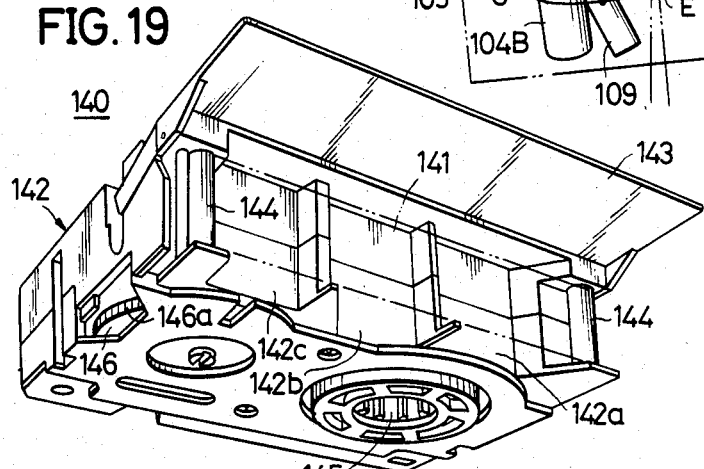
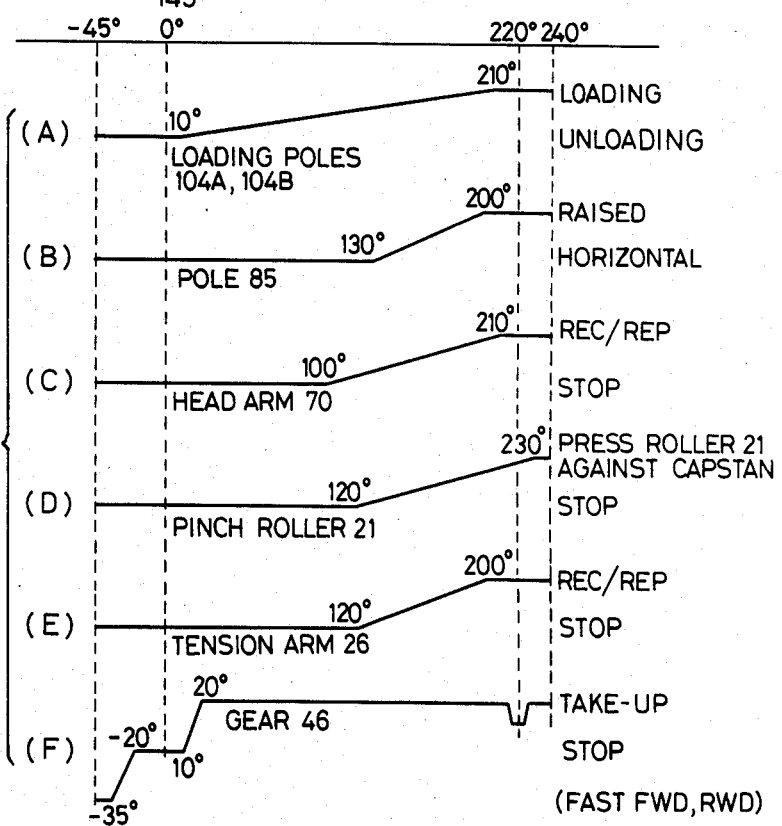

HELICAL SCAN TYPE RECORDING AND/OR REPRODUCING APPARATUS

BACKGROUND OF THE INVENTION

The present invention generally relates to automatic tape loading type recording and/or reproducing apparatuses, and more particularly to an automatic tape loading type recording and/or reproducing apparatus in which a recording and/or a reproduction are carried out in a state where a tape is drawn out of a tape cassette and is wrapped around a peripheral surface of a guide drum which has heads and has a small diameter, over an angular range which greatly exceeds 180°.

Generally, in a video tape recorder (hereinafter simply referred to as a VTR) of the type which uses a tape cassette, a magnetic tape is wrapped around a peripheral surface of a guide drum over an angular range of approximately 180°, and video tracks are formed on the tape with a predetermined pattern. In such a VTR, a vertical pole and a sloping pole on the tape supply side, and a vertical pole and a sloping pole on the tape take-up side, respectively move in a plane which coincides with the height of the tape within the tape cassette, so as to carry out a tape loading operation. The guide drum is inclined by a small angle of approximately 6°.

Recently, there has been a development in downsizing the VTR, by maintaining magnetic tape compatibility with the existing VTR, that is, without changing the pattern of the video tracks or the like on the tape.

As one method of downsizing the VTR and still keep the above conditions satisfied, there is a method of increasing the number of video heads, reducing the diameter of the guide drum, and increasing the angular range over which the tape is wrapped around the peripheral surface of the guide drum. For example, there was a method of providing four video heads at a 90° interval, reducing the diameter of the guide drum to $\frac{2}{3}$ the diameter of the existing guide drum, and wrapping the tape around the peripheral surface of the guide drum over an angular range of approximately 270° instead of the angular range of approximately 180° which is employed in the existing VTR. In this case, the four video heads are switched so as to operate with an interval of 270°. According to this method, the video tracks are formed on the tape with a pattern which is the same as the pattern which is in conformance with the existing standard, and the magnetic tape compatibility is maintained. Moreover, the VTR can be downsized because of the downsized guide drum.

As a method of wrapping the tape around the peripheral surface of the guide drum over the angular range of approximately 270°, one may consider employing the existing tape loading system which wraps the tape around the peripheral surface of the guide drum over the angular range of approximately 180°. In this case, loading poles must travel over a greater distance in order to wrap the tape around the peripheral surface of the guide drum over the angular range of approximately 270°. Further, due to the increased wrapping angle of the tape, the inclination angles of the guide drum and the sloping poles respectively increase. It is calculated that a rotary axis of the guide drum must be inclined by approximately 40° with respect to an imaginary line which is vertical to a chassis of the VTR. The sloping angle of the sloping poles with respect to the tape must be approximately 27°. When the inclination angle of the guide drum increases in this manner, the height of the guide drum increases and the guide drum occupies a large space, although the diameter of the guide drum is small. As a result, it becomes difficult to effectively downsize the VTR. On the other hand, when the inclination angle of the sloping poles increases in the above manner, it is difficult to ensure a smooth tape movement. Further, the sloping poles cannot be accommodated within the small space in the tape cassette for receiving the loading poles, and it becomes impossible to carry out an automatic tape loading operation.

A magnetic recording and/or reproducing apparatus was proposed in a U.S. patent application Ser. No. 543,924 filed Oct. 20, 1983, in which the assignee is the same as the assignee of the present application. According to this previously proposed apparatus, the inclination angle of the guide drum is approximately of the same order as the inclination angle of the existing guide drum. Further, guide poles are designed to wrap the tape around the peripheral surface of the guide drum over an angular range of approximately 270°.

SUMMARY OF THE INVENTION

Accordingly, it is a general object of the present invention to provide a novel and useful automatic tape loading type recording and/or reproducing apparatus which makes it possible to carry out an automatic tape loading operation in the previously proposed recording and/or reproducing apparatus described before.

Another and more specific object of the present invention is to provide an automatic tape loading type recording and/or reproducing apparatus comprising first tape loading means which moves in a plane which is an extension of a tape moving plane within a loaded tape cassette, for guiding a tape at an entrance side with respect to a guide drum in a tape moving direction, second tape loading means which moves while changing the height and inclination angle thereof, for guiding the tape at a certain position which is lower than the extension plane and is on an exit side with respect to the guide drum in the tape moving direction so that the tape on the downstream side of this certain position moves in a direction so as to resume its original height position, and tape guiding means which makes contact with the tape which is drawn out of the loaded tape cassette by the second tape loading means, for guiding the tape to move in a direction toward the loaded tape cassette. According to the apparatus of the present invention, the magnetic tape compatibility can be maintained with the existing apparatus, the apparatus can be downsized effectively, and it is possible to carry out an automatic tape loading operation in the downsized apparatus.

Other objects and further features of the present invention will be apparent from the following detailed description when read in conjunction with the accompanying drawings.

BRIEF DESCRIPTION OF THE DRAWINGS

FIGS. 1 and 2 are a plan view and a side view respectively showing an embodiment of an automatic tape loading type recording and/or reproducing apparatus according to the present invention in a stop mode;

FIG. 4 is a disassembled view showing a disassembled cam structure in the apparatus shown in FIG. 2;

FIG. 5 is a side view showing a relationship between a rising and falling pole and the cam structure in the apparatus shown in FIG. 1;

FIG. 7 is a side view showing a take-up side loading pole and mechanisms related thereto;

FIGS. 8 and 9 are a plan view and a perspective view respectively showing a guide rail which guides a take-up side loading pole base;

FIG. 10 shows a change in the height of the guide rail;

FIGS. 11 and 12 respectively show cross sectional shapes of the guide rail along lines XI—XI and XII—XII in FIG. 8;

FIGS. 15, 16, and 17 are a left side view, a right side view, and a view from a side Y in FIG. 13, respectively showing a wrapped state of a tape with respect to a guide drum when the tape loading operation is completed;

FIGS. 18(A), 18(B), 18(C), 18(D), 18(E), and 18(F) respectively show operating states of loading poles, a rising and falling pole, a right head arm, a pinch roller, a tension arm, and a take-up gear, in correspondence with a rotational position of the cam structure shown in FIG. 4; and FIG. 19 is a perspective view showing an example of a miniature type tape cassette which is viewed from the bottom and is loaded into the apparatus shown in FIG. 1.

DETAILED DESCRIPTION

Figure 1:
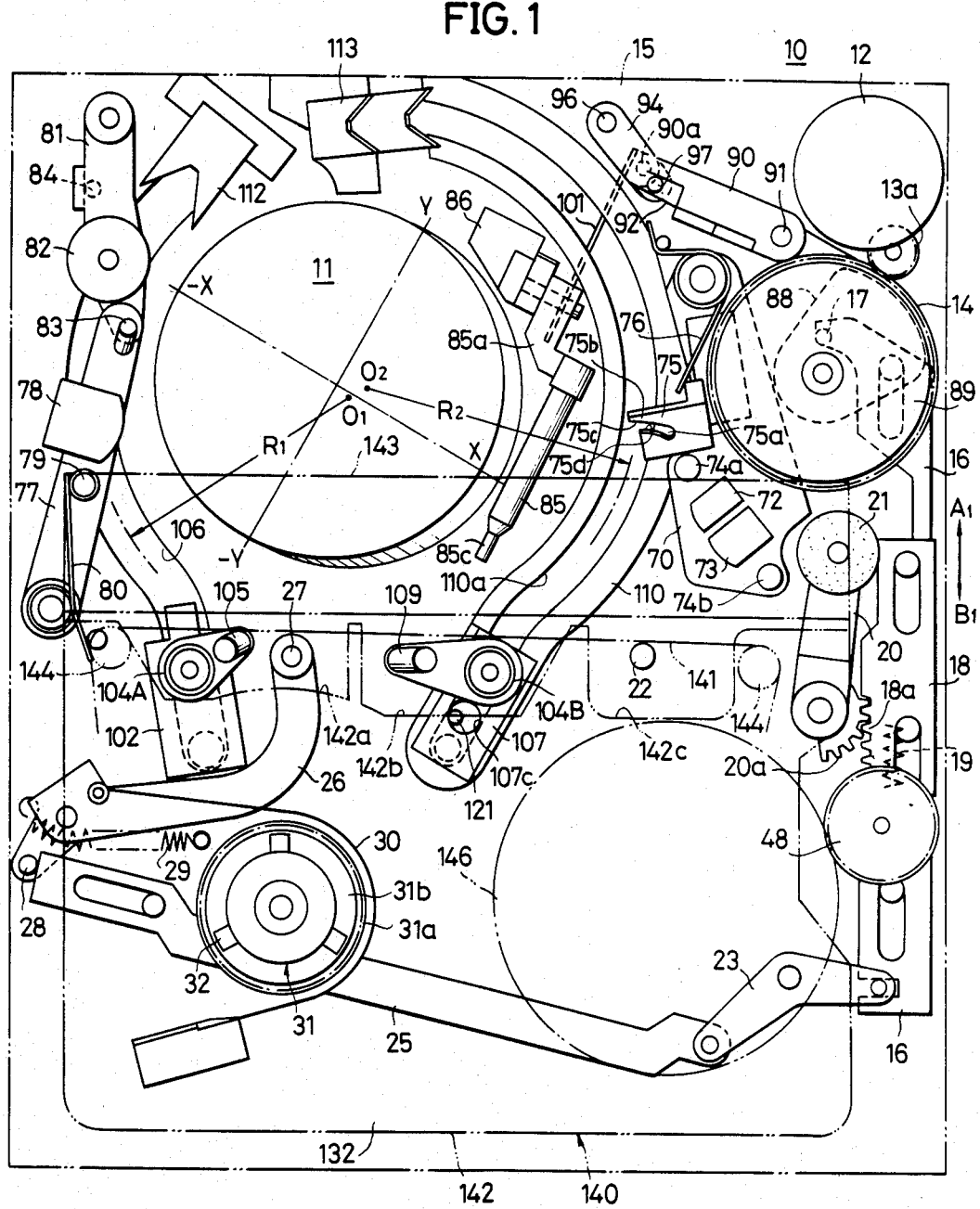
Figure 13:
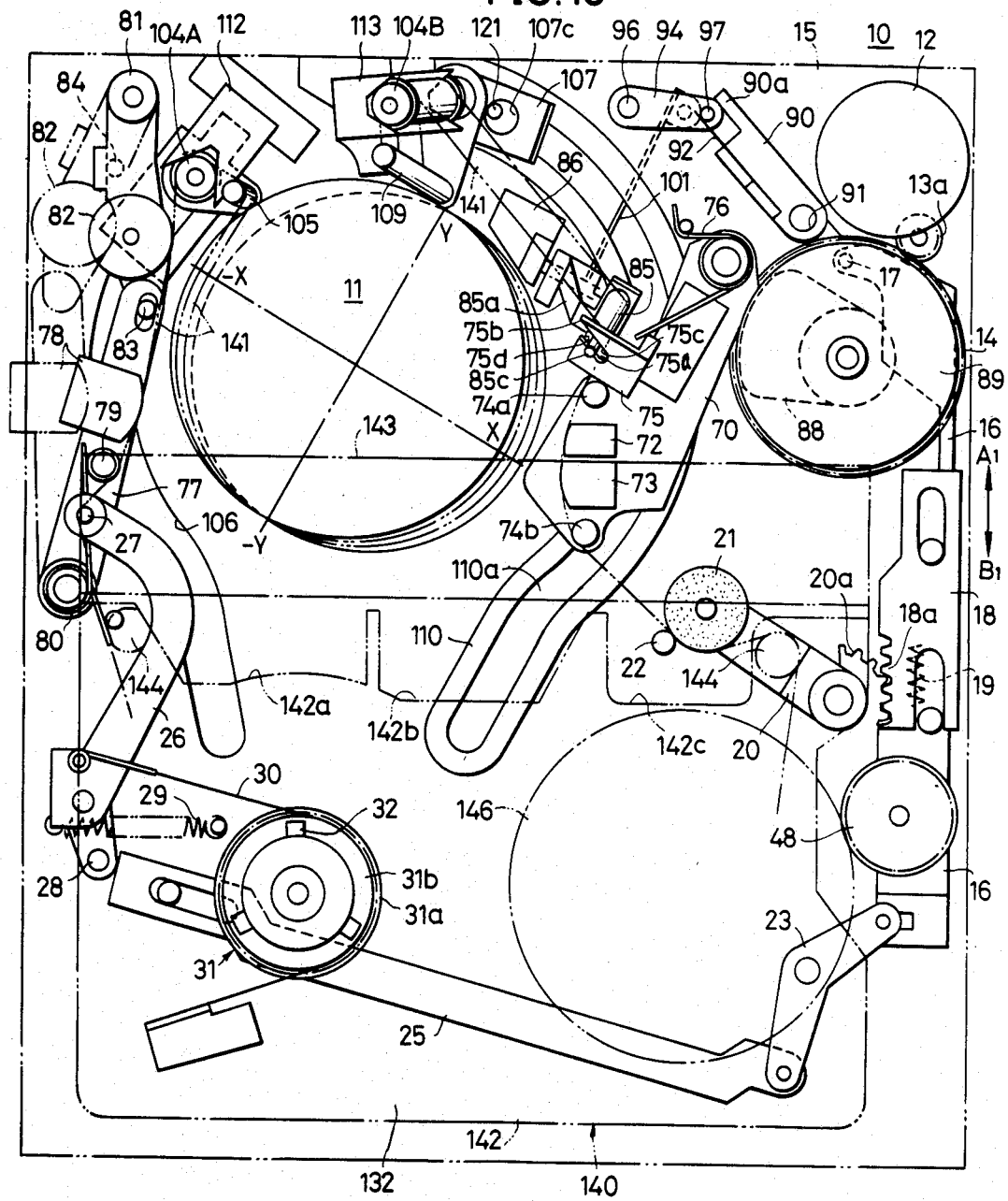
FIG. 13 is a plan view showing the apparatus according to the present invention in a state where the tape loading operation is completed (that is, in a recording or reproducing mode)

As particularly shown in FIGS. 1, 2, and 13, an automatic tape loading type recording and/or reproducing apparatus 10 comprises a guide drum 11. The guide drum 11 has four rotary video heads arranged with an angular separation of 90°. The diameter of the guide drum 11 is ⅔ the diameter of the conventional guide drum which is employed in the existing apparatus. A magnetic tape 141 is wrapped around the peripheral surface of the guide drum 11 over an angular range of approximately 270° or more. The four video heads are successively switched and operated in terms of the angle over which the tape 141 is wrapped around the peripheral surface of the guide drum 11. As a result, a track pattern which is the same as the track pattern formed by the existing apparatus, is formed on the tape 141 by the four video heads. Because the tape 141 is wrapped around the guide drum 11 in the manner which will be described later on in the specification, the rotary axis of the guide drum 11 is only inclined by approximately 6° in an X-direction with respect to an imaginary line which is vertical to a chassis base of the apparatus 10, and the inclination angle of the guide drum 11 is small. Accordingly, the increase in the height of the guide drum 11 and therefore the increase in the occupying space of the guide drum 11, is extremely small. Hence, the occupying space of the guide drum 11 within the apparatus 10, is considerably small compared to the conventional guide drum, and the apparatus 10 can be downsized effectively.

The guide drum 11 is mounted at a height position which is lower than the height position of the conventional guide drum, due to the manner in which the tape 141 is wrapped around the guide drum 11. For this reason, an open lid 143 of a miniature type tape cassette 140 which is loaded into a cassette loading part 132, can assume a position slightly higher than the upper surface of the guide drum 11, as shown in FIG. 2. Hence, in the present embodiment, the tape cassette 140 is loaded into the loading part 132 in a state where a part of the open lid 143 is slightly separated from the upper surface of the guide drum 11 and extends over the upper surface of the guide drum 11 in the plan view. This means that the loaded tape cassette 140 and the guide drum 11 are extremely close to each other, and this arrangement also contributes to the downsizing of the apparatus 10. tape cassette 140 comprises a As shown in FIG. 19, the tape cassette 140 comprises a cassette case 142, the tape 141 which is accommodated within the cassette case 142, and the lid 143. Guide rollers 144 and 144 guide the tape 141 along the front of the cassette case 142, and the lid 143 is provided to protect the tape 141 which is exposed between the guide rollers 144 and 144 at the front of the cassette case 142. The tape cassette 140 is loaded into the loading part 132 of the apparatus 10 in the state shown in FIGS. 1 and 2 That is, a supply reel hub 145 of the tape cassette 140 fits over an engaging part 32 of the apparatus 10, and a gear part 146a formed on the outer periphery of a take-up reel hub 146 meshes with a large diameter gear 48a. Further, loading poles 104A and 104B, a capstan 22, or the like relatively enter within cutouts 142a, 142b, and 142c formed at the front of the cassette case 142. In this loaded state of the tape cassette 140, the lid 143 assumes a horizontally rotated position and is open.

A loading motor 12 is rotatable in both forward and reverse directions. The loading motor 12 rotates a cam gear 14 through a speed reduction gear system 13 which includes an output gear 13a. The cam gear 14 carries out a switching operation for each operating mode of the apparatus 10, and carries out loading and unloading operations.

A play bar 16 is located on the lower surface of a chassis base 15, and is slidable in the directions of arrows A1 and B1. A pin 17 located on one end of the play bar 16, fits within a cam groove 14a of the cam gear 14 as shown in FIG. 4. As will be described later on in the specification, the play bar 16 applies an urging force to a pinch roller and controls a tension arm.

A pinch roller bar 18 comprises a rack 18a on a side surface thereof, and is slidable on the chassis base 15. This pinch roller bar 18 is coupled to the play bar 16 through a compressed coil spring 19.

A pinch roller 21 is supported on the tip end of a pinch roller arm 20. A fan-shaped gear 20a located on the base end of the pinch roller arm 20, meshes with the rack 18a.

A connecting lever 23 is rotatable on the lower surface of the chassis base 15. One end of the connecting lever 23 is coupled to the play bar 16, and the other end of the connecting lever 23 is coupled to a tension arm bar 25.

A tension arm 26 comprises a tension pole 27 at the tip end thereof. A free end of a brake band 30 which surrounds a supply reel disc 31, is coupled to the base end of the tension arm 26. The tension arm 26 is urged to rotate counterclockwise by a spring 29. However, in a stop mode of the apparatus 10, a pin 28 is in contact with the left end of the tension arm bar 25, and the tension arm 26 is restricted to the rotational position shown in FIG. 1.

The supply reel disc 31 comprises an outer peripheral gear 31a, a brake drum 31b, and the engaging part 32 on the upper surface thereof.

Next, description will be given with respect to a capstan driving system and a reel disc driving system by referring mainly to FIG. 3. A capstan motor 33 rotates a flywheel 35 by way of a belt 34. An intermediate wheel 37 guides the outer surface of the belt 34, and makes it possible to wrap the belt 34 around the flywheel 35 and a motor pulley 36 over a large angular range. The flywheel 35 unitarily comprises a flywheel gear 39 and the capstan 22. The flywheel gear 39 becomes the source of rotation during a tape take-up mode, a rewinding mode, and a tape fast-forwarding mode of the apparatus 10. The flywheel 39 meshes with an intermediate gear 40 on the lower surface of the chassis base 15.

A reel driving system gear 41 comprises a large diameter gear 41a and a small diameter gear 41b. The large diameter gear 41a meshes with the intermediate gear 40, and the small diameter gear 41b is separated from and opposes a gear 42 and a rewind gear 43. The gear 42 has upper and lower gears 42a and 42b which are coaxially provided with a friction clutch disposed therebetween. Similarly, the rewind gear 43 has upper and lower gears 43a and 43b which are coaxially provided with a friction clutch disposed therebetween. A fast-forward gear 44 is supported on the lower surface of a plate 45, and opposes the small diameter gear 41b and the upper gears 42a and 43a. A take-up gear 46 is supported on the upper surface of a gear arm 47, and is disposed immediately below the fast-forward gear 44. The take-up gear 46 opposes the small diameter gear 41b and the lower gears 42b and 43b.

As shown in FIG. 2, a cassette driving gear 48 comprises the large diameter gear 48a, and a small diameter gear 48b and a brake drum 48c which are provided on the lower part thereof. The small diameter gear 48b meshes with the upper gear 42a of the take-up gear 42. When the tape cassette 140 is loaded into the loading part 132, the large diameter gear 48a meshes with the gear part 146a of the take-up reel hub 146 within the tape cassette 140.

A lower cam 49 is coaxially fixed on the upper surface of the cam gear 14 as shown in FIG. 2. As shown in FIG. 4, the cam gear 49 comprises cam grooves 49a and 49b on the upper surface thereof, and a cam 49c. As shown in FIG. 3, a play bar 50 is rotatably provided on the chassis base 15. A pin 51 located on one end of the play bar 50, fits into the cam groove 49a. The other end of the play bar 50 is coupled to one end of a connecting lever 53. The gear arm 47 is coupled to the other end of the connecting lever 53. A rewind lever 56 is rotatably provided on the chassis base 15. The right end of the rewind lever 56 is coupled to the connecting lever 53 through a lever 57, and the left end of the rewind lever 56 supports the plate 45. A transmission gear 59 meshes with the upper gear 43a of the rewind gear 43, and with the gear 31a of the supply reel disc 31.

Description will now be given with respect to a reel disc driving system by referring to FIG. 3. A brake lever 60 is rotatably provided on the chassis base 15. One end of the brake lever 60 makes contact with a side surface of the cam 49c as shown in FIG. 4, and the other end of the brake lever 60 is coupled to one end of a lever 61 by a pin. A brake plate 62 is slidable in the directions of the arrows A1 and B1. A braking member 63a is located on one end of the brake plate 62, and a bent member 62a is located on the other end of the brake plate 62. The brake plate 62 is urged to slide in the direction of the arrow A1 by a spring 64. A lever 65 is rotatably provided on the chassis base 15, and is coupled at one end thereof to the lever 61 by a pin so as to oppose the bent member 62a. The other end of the lever 65 is coupled to a bar 66 by a pin. A brake arm 67 is rotatably provided in a vicinity of the supply reel disc 31, and has a braking member 63b provided on one end thereof. The brake arm 67 is urged to rotate counterclockwise by a spring 68. A pin 69 located on the other end of the brake arm 67, fits into an elongated hole 66a which is formed on the left end of the bar 66.

In the stop mode of the apparatus 10, the brake lever 60 makes contact with a depression of the cam 49c, and is rotated counterclockwise. In this state, the braking member 63a presses against the brake drum 48c, and the braking member 63b presses against the brake drum 31b. Thus, the cassette driving gear 48 and the supply reel disc 31 are both braked.

Next, description will be given with respect to a head arm system by referring back to FIG. 1. A right head arm 70 is provided on the chassis base 15 so that the right head arm 70 is rotatable within a plane parallel to the chassis base 15. A head base is provided on the upper surface of one end of the right head arm 70. An audio erasing head 72 and an audio and control signal recording and reproducing head 73 are mounted on this head base. A pair of tape guides 74a and 74b are also located on the right head arm 70, with the heads 72 and 73 disposed therebetween. A stopper 75 which will be described later on in the specification, is further provided on the upper surface of the right head arm 70. The right head arm 70 is urged to rotate counterclockwise by a torsion coil spring 76. In the stop mode, the right head arm 70 is rotated counterclockwise to the position shown in FIG. 1 and makes contact with a minimum diameter part of a head cam 88 as shown in FIG. 4, and the heads 72 and 73 are receded from a moving path of the tape 141.

A left head arm 77 comprises a full-width erasing head 78 and a tape guide 79 on the upper surface thereof, and is urged to rotate clockwise by a torsion coil spring 80. An arm 81 supports an impedance roller 82. A pin 83 located on the tip end of the arm 81, fits into an elongated hole which is formed at the tip end of the left head arm 77. Accordingly, the left head arm 77 and the arm 81 are rotationally restricted in the state shown in FIG. 1 because a part of the arm 81 makes contact with a pin 84 which is located on the chassis base 15, and the full-width erasing head 78 and the impedance roller 82 project within a moving path of the tape 141.

The cam structure will be described in conjunction with FIG. 4. The cam structure unitarily comprises the cam gear 14, the lower cam 49, the head cam 88, and an upper cam 89 in this sequence from the bottom. A pin 93 fits into a cam groove 89a which is formed on the lower surface of the upper cam 89. This pin 93 is located on one end of a pole lever 90 which is supported on a shaft 91.

Next, description will be given with respect to a rising and falling pole and mechanisms related thereto, by referring to FIG. 5. A base part 85a of a rising and falling pole 85, is rotatably supported by a shaft 87. This shaft 87 is located on a support block 86 which is secured on the chassis base 15. An arcuate gear 85b having approximately ⅔ the circumference, is formed on one end of the base 85a.

A leaf spring 92 is provided on one end of the pole lever 90. A pin 97 located at the tip end of an upper pole arm 94, is pinched between a projection 90a of the pole lever 90 and the leaf spring 92. The upper pole arm 94 is fixed to the upper end of a rotary shaft 96 which is supported by a cylindrical bearing 95. A lower pole arm 98 is fixed on the lower end of the rotary shaft 96, and the lower pole arm 98 rotates unitarily with the upper pole arm 94. A rising and falling lever 99 is rotatably supported on a downwardly extending part 86a of the support block 86, by a shaft 100. A fan-shaped gear 99a which is formed on the upper end of the lever 99, meshes with the arcuate gear 85b. The lower end of the lever 99 is coupled to the tip end of the lower pole arm 98 through a connecting plate 101, by use of a pin.

In the stop mode, the pole lever 90 assumes the position rotated counterclockwise as shown in FIG. 1. Further, the rising and falling pole 85 assumes the angular position substantially parallel to the chassis base 15.

Next, description will be given with respect to a loading pole mechanism and mechanisms related thereto.

Figure 6:
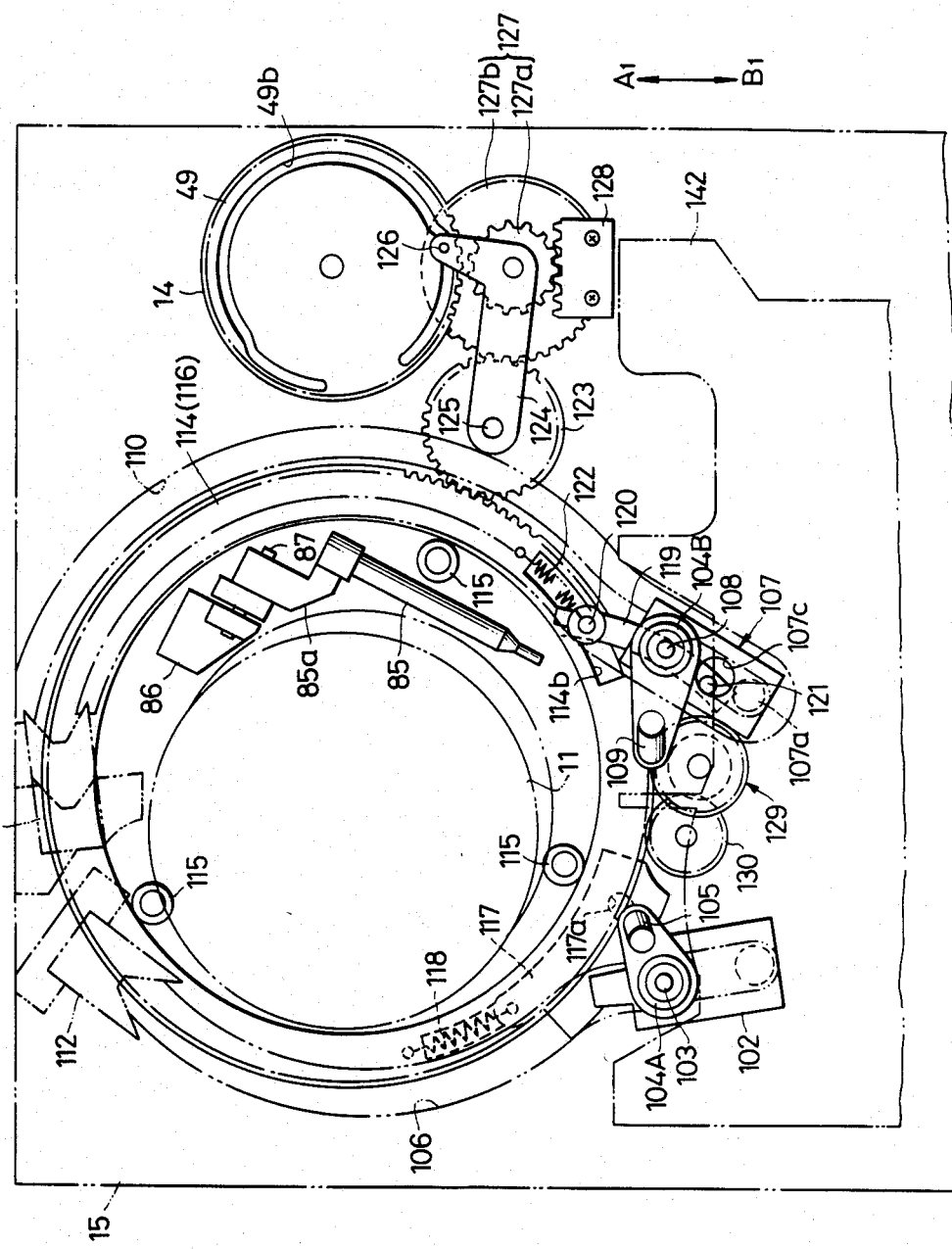
FIG. 6 is a plan view showing a tape loading mechanism in the apparatus shown in FIG. 1.

FIG. 6 shows the loading pole mechanism in an unloading state. A left loading pole base 102 has a vertical shaft 103 on the upper surface thereof, and this vertical shaft 103 supports the supply side loading pole 104A. A sloping pole 105 is located on the left loading pole base 102 in a vicinity of the supply side loading pole 104A. The left loading pole base 102 is movable along a guide groove 106 which is formed on the chassis base 15. The guide groove 106 is an arcuate groove having a radius $R_1$ about a point $0_1$ as shown in FIG. 1.

As also shown in FIG. 7, a right loading pole base 107 has a vertical shaft 108 which supports the take-up loading pole 104B. A sloping pole 109 is located on the right loading pole base 107 in a vicinity of the take-up loading pole 104B. The right loading pole base 107 is movable along a guide groove 110a of a guide rail 110 which is fixed on the chassis base 15.

FIGS. 8 and 9 show the guide rail 110, and FIG. 10 shows the change in the height of the guide groove 110a of the guide rail 110. The guide rail 110 comprises a flat part 110A between points $P_0$ and $P_1$ as indicated by a line I in FIG. 10, a downwardly sloping part 110C between points $P_2$ and $P_3$ as indicated by a line III in FIG. 10, and a bent part 110B which bends while sloping downwardly so as to connect the parts 110A and 110C as indicated by a line II in FIG. 10. The flat part 110A is at a height position which is higher than the chassis base 15 by a distance H, and is a surface parallel to the chassis base 15. The flat part 110A has a cross sectional shape shown in FIG. 11. The sloping part 110C is a surface which generally slopes downwardly with a predetermined angle, and has a cross sectional shape shown in FIG. 12. The terminal end of the sloping part 110C reaches the lower surface of the chassis base 15. The guide groove 110a is an arcuate groove having a radius $R_2$ about a point $O_2$, where the radius $R_2$ is slightly larger than the radius $R_1$. A width $W_2$ of the guide groove 110a at the bent part 110B, is slightly wider than a width $W_1$ at the flat part 110A and the sloping part 110C, so that the right loading pole base 107 can move smoothly along the guide groove 110a. In order to ensure a smooth movement of the right loading pole base 107, the guide rail 110 is made of an aluminum alloy which is treated with a curing agent on the surface thereof, or is molded from a material such as polyacetal or the like.

As shown in FIG. 7, the loading poles 104A and 104B each comprise a rotary roller 104a and fixed rings 104b and 104c which are provided to restrict the height position of the moving tape 141. A pair of guide projections 107a and 107b located on the lower surface of the right loading pole base 107, respectively fit into the guide groove 110a. A leaf spring 111 is secured on the guide projection 107a by a screw. As a result, the lower surface of the right loading pole base 107 is pushed against the upper surface of the guide rail 110, and the right loading pole base 107 is guided along the guide groove 110a. The construction of the left loading pole base 102 is similar to the construction of the right loading pole base 107. The width $W_2$ of the guide groove 110a at the bent part 110B is sufficiently large compared to the diameter of the guide projections 107a and 107b, so that there is sufficient play to enable the right loading pole base 107 to pass by the bent part 110B of the guide groove 110a while becoming inclined. For example, the width $W_2$ of the guide groove 110a is wider than the diameter of the guide projections 107a and 107b, by a value which is in the order of 0.5 mm.

A pole stopper 112 for positioning the loading pole 104A at the time of the loading, is provided in the terminal part of the guide groove 106. Similarly, a pole stopper 113 for positioning the loading pole 104B at the time of the loading, is provided on the chassis base 15, in a vicinity of the terminal end of the guide rail 110.

A ring gear 114 for moving the take-up loading pole 104B, and a ring gear 116 for moving the supply loading pole 104A, are respectively located on the lower surface of the chassis base 15, below the guide drum 11. The ring gears 114 and 116 are arranged concentrically with the ring gear 114 arranged above the ring gear 116, and both the ring gears 114 and 116 are supported at three inner peripheral positions by three support rollers 115. The ring gears 114 and 116 each have a gear formed on the outer periphery thereof. A large diameter gear 129a of a speed reduction gear 129 meshes with the ring gear 114, and a reversal gear 130 meshes with the ring gear 116 and with a small diameter gear 129b of the speed reduction gear 129.

A guide piece 117 which is made of a synthetic resin and has a sideways U-shaped cross section, is slidably provided on the ring gear 116 so that the ring gear 116 is disposed within the U-shaped cross section. A coil spring 118 is stretched across the ring gear 116 and the guide piece 117. A lower extension of the vertical shaft 103 on the loading pole base 102, penetrates through an elongated hole 117a in the guide piece 117. Accordingly, the ring gear 116 moves the loading pole base 102 through the coil spring 118 and the guide piece 117.

An arcuate window 114b is formed in the ring gear 114. One end of an arcuate guide plate 119 is movably supported by a calked pin 120 which fits into the arcuate window 114b. A pin 121 is embeddedly provided on the tip end of the guide plate 119. The upper part of the pin 121 passes through the guide groove 110a, and penetrates through a circular hole 107c in the loading pole base 107 which is on the guide rail 110. The loading pole base 107 not only moves in a horizontal plane, but also moves up and down accompanied by the inclination. For this reason, the length (height) of the pin 121 is set long, and the diameter of the circular hole 107c is made large compared to the diameter of the pin 121. Further, the base of the guide plate 119 and the ring gear 114 are coupled by a coil spring 122.

A loading gear 123 meshes with the ring gear 114. A loading arm 124 is rotatable about a pin 125 on the loading gear 123, and a pin 126 located on the tip end of the loading arm 124 fits into the cam groove 49b of the lower cam 49 as shown in FIG. 4. A movable gear 127 is rotatably supported at an intermediate part of the loading arm 124. As shown in FIG. 6, the movable gear 127 comprises an upper small diameter gear 127a and a lower large diameter gear 127b. The large diameter gear 127b constantly meshes with the loading gear 123, and the small diameter gear 127a can engage to or disengage from the cam gear 14. In the stop mode, the loading arm 124 assumes the position rotated clockwise, and for this reason, the small diameter gear 127a is disengaged from the cam gear 14 and meshes with a fixed rack 128 which is mounted on the chassis base 15.

Next, description will be given with respect to the operation of the apparatus 10 by referring to FIGS. 13 through 17.

When the apparatus 10 is operated in the stop mode so that the apparatus 10 assumes a recording or reproducing mode, the loading motor 12 starts to rotate and the cam structure rotates clockwise over 240° under control of a rotational angle detector (not shown).

Accordingly, the play bar 16 slides in the direction of the arrow A1 due to the action of the cam groove 14a shown in FIG. 4, and the pinch roller bar 18 also slides in the direction of the arrow A1 by way of the spring 19. The pinch roller arm 20 rotates counterclockwise due to the action of the rack 18a, and the pinch roller 21 presses against the capstan 22 due to the action of the spring 19.

When the play bar 16 slides, the tension arm bar 25 moves to the right by way of the lever 23. As a result, the tension arm 26 is released from the restricted state, and rotates counterclockwise by the action of the spring 29. Therefore, the tension pole 27 moves towards the moving path of the tape 141, and the brake band 30 makes contact with the brake drum 31b so as to lightly brake the supply reel disc 31.

In the recording or reproducing mode, the capstan motor 33 rotates in the forward direction, and the flywheel 35 is rotated clockwise. The tape 141 is driven in a state pinched between the capstan 22 and the pinch roller 21. In addition, the flywheel 35 carries out a take-up operation by way of the flywheel gear 39. In other words, when the lower cam 49 rotates clockwise over 240° in FIG. 3, the play bar 50 rotates clockwise, and the gear arm 47 moves in the direction of the arrow B1 by way of the lever 53. In addition, the take-up gear 46 meshes with the small diameter gear 41b of the reel driving gear 41. In this state, the gear 41 is rotated clockwise by the flywheel gear 39 by way of the intermediate gear 40. For this reason, the take-up gear 46 swings to the right and meshes with the lower gear 42b of the gear 42, as indicated by a one-dot chain line in FIG. 3. The cassette driving gear 48 is rotated counterclockwise through the friction clutch, and the take-up reel hub 146 rotates clockwise so as to take up the tape 141 on the take-up reel of the tape cassette 140.

Figure 3:
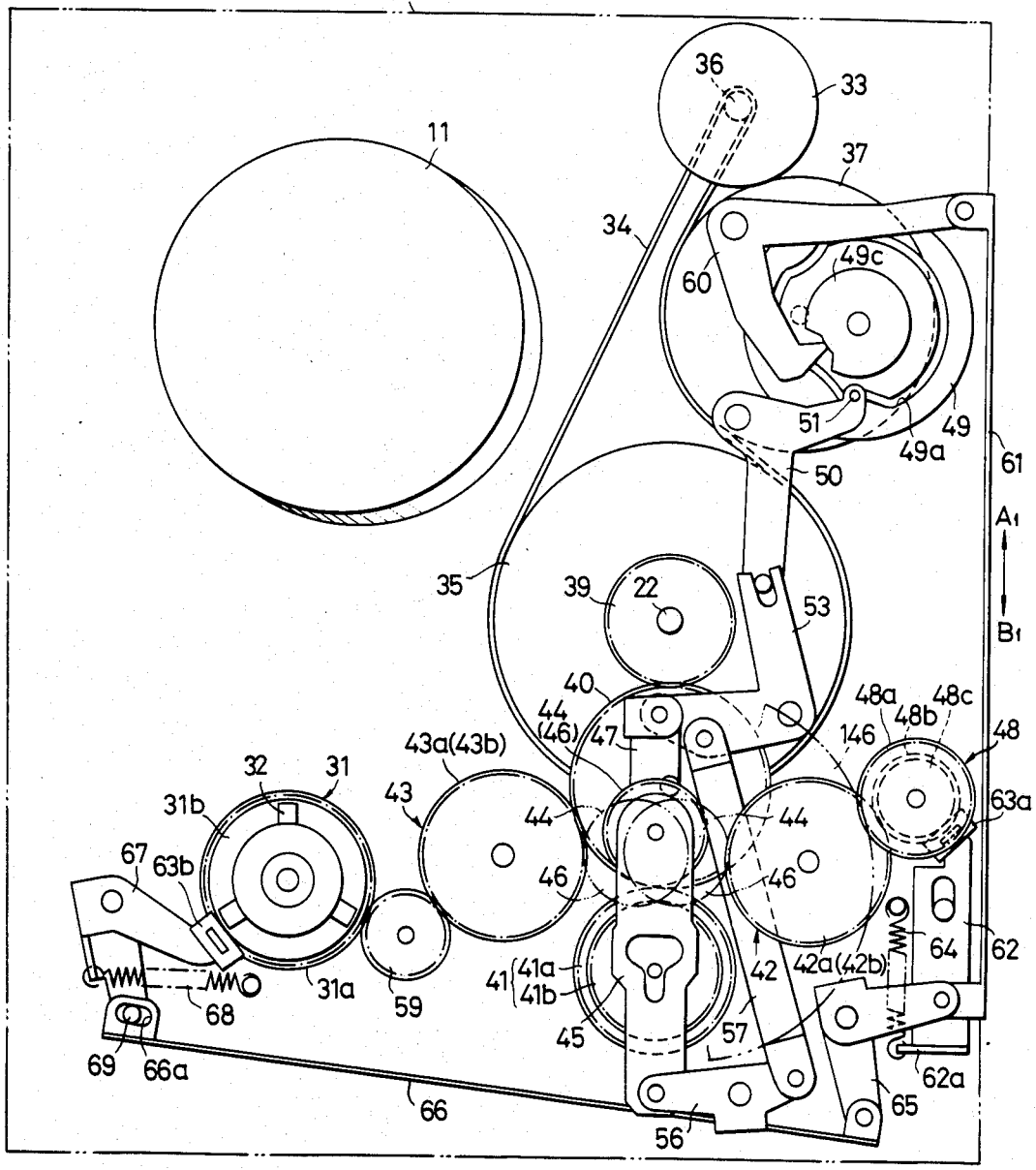
FIG. 3 is a plan view showing a reel driving system of the apparatus shown in FIG. 1.

In addition, in the recording or reproducing mode, the brake lever 60 makes contact with a maximum diameter part of the cam 49c and rotates clockwise in FIG. 3. The lever 65 rotates clockwise by way of the bar 61, and the lever 66 moves to the left. Due to the rotation of the lever 65, the brake plate 62 slides in the direction of the arrow B1, and the brake arm 67 rotates clockwise due to the action of the bar 66. As a result, the braking action with respect to the cassette driving gear 48 and the supply reel disc 31 is cancelled.

Due to the rotation of the head cam 88, the head arm 70 is pushed and rotated clockwise by the head cam 88. Finally, the head arm 70 makes contact with a maximum diameter part of the head cam 88, and the audio erasing head 72 and the audio and control head 73 respectively move to the moving path of the tape 141.

Furthermore, due to the rotation of the cam 89, the pole lever 90 rotates clockwise. When the pole lever 90 rotates, the pin 97 is pushed by the leaf spring 92, and the upper pole arm 94 and the lower pole arm 98 respectively rotate counterclockwise The rising and falling pole 85 rises by approximately 70° as indicated by a two-dot chain line in FIG. 5, by way of the connecting plate 101 and the rising and falling lever 99. The rising and falling pole 85 moves to the inner side of the tape path which is being formed, and guides the tape 141. Substantially at the same time as when the rising and falling pole 85 rises, the head arm 70 rotates clockwise. Hence, a tip end 85c of the rising and falling pole 85 is received by a projecting part 75b of the stopper 75, and is thereafter relatively guided within a groove 75a which has a generally arcuate shape and is continuous with the projecting part 75b. The rising and falling pole 85 is urged in the rising direction by the action of the leaf spring 92. Accordingly, the tip end 85c of the rising and falling pole 85 does not simply fit into the groove 75a of the stopper 75, but is resiliently pressed against one side wall 75c of the groove 75a. Thus, although the rising and falling pole 85 receives a force in the falling direction due to the action of a tape tension which is introduced when the tape 141 starts to move, the rising and falling pole 85 will not fall by this tape tension and is stably locked in a predetermined raised position with a satisfactory precision. The other side wall 75d of the groove 75a receives the tip end 85c so as to restrict the rotation of the rising and falling pole 85 in the falling direction, when a large external force, for example, acts on the rising and falling pole 85 in the falling direction thereof.

Figure 14:
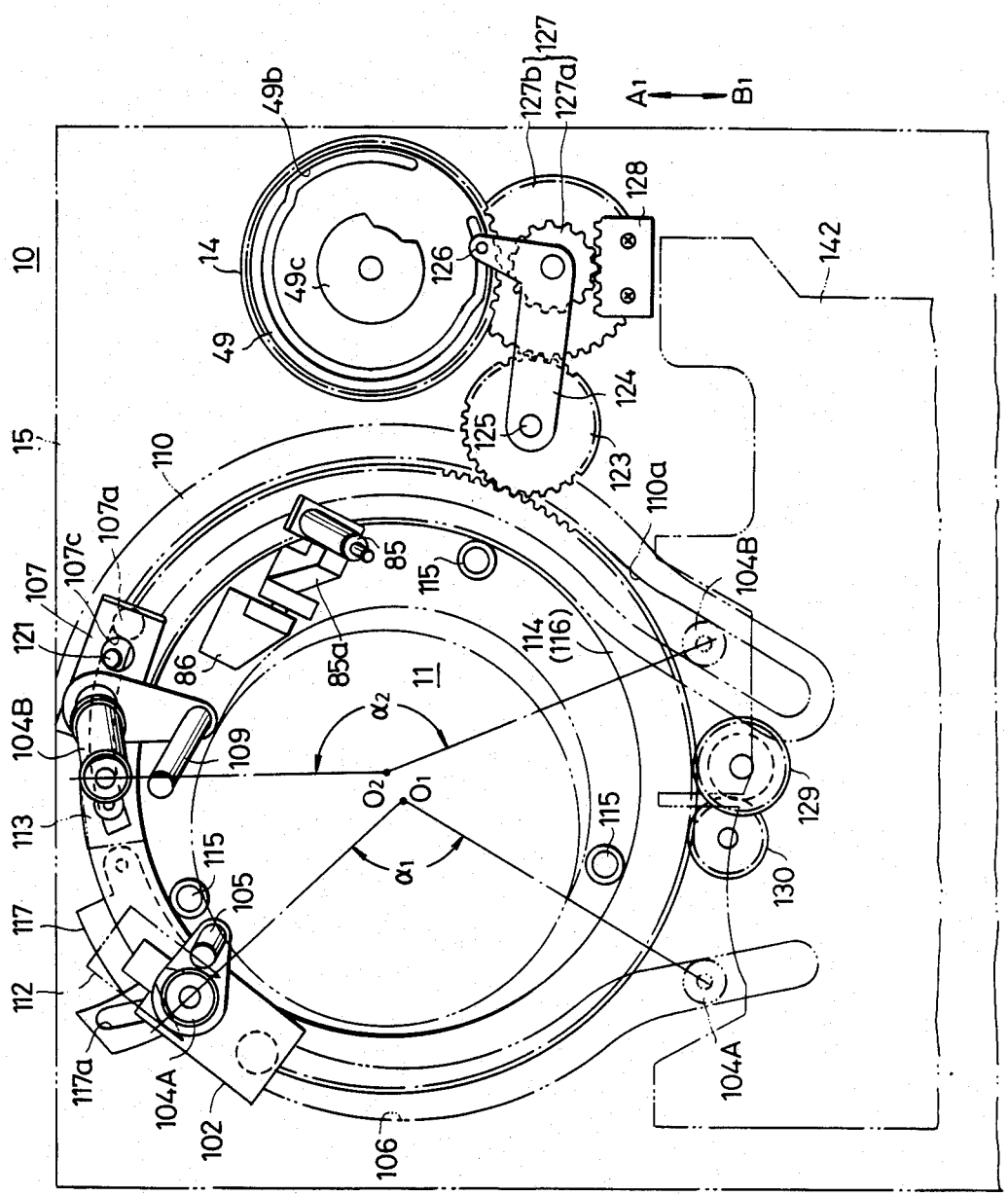
FIG. 14 shows a tape loading mechanism shown in FIG. 13.

As shown in FIG. 14, when the lower cam 49 rotates, the loading arm 24 is rotated counterclockwise by the action of the cam groove 49b. As a result, the movable gear 127 moves towards the cam gear 14, and the small diameter gear 127a meshes with the cam gear 14. Hence, the upper ring gear 114 is rotated counterclockwise by way of the large diameter gear 127b of the movable gear 127 and the loading gear 123, and the lower ring gear 116 is rotated clockwise by way of the speed reduction gear 129 and the reversal gear 130, at a speed which is slower than the rotating speed of the upper ring gear 114. The rotating speeds of the ring gears 114 and 116 are different, because the loading poles 104A and 104B must simultaneously start and finish the respective movements although the distances over which the loading poles 104A and 104B must move are different. The rotational speeds of the ring gears 114 and 116 are set, so that a ratio between the respective rotational speeds is substantially in correspondence with a ratio between the distances over which the respective ring gears 114 and 116 must move.

When the lower ring gear 116 rotates clockwise, the loading pole base 102 moves along the guide groove 106 of the chassis base 15 up to the position shown in FIG.

14, without changing the height position thereof. While the loading pole base 102 moves, the head arm 77 and the impedance roller arm 82 are temporarily pushed back by the loading pole base 102 as indicated by a two-dot chain line in FIG. 13. As shown in FIG. 14, the loading pole 104A moves (undergoes a rotational displacement of an angle $\alpha_1$) to a position slightly exceeding the left side of the guide drum 11, without changing the height plane (reference plane) S in which the tape 141 moves within the tape cassette 140. The loading pole 104 is pushed against the stopper 112 by the action of the coil spring 118 as shown in FIG. 6.

When the upper ring gear 114 rotates counterclockwise, the loading pole base 107 is engaged by the pin 121. As a result, the loading pole base 107 moves along the guide groove 110a, over the flat part 110A, the bent part 110B, and the sloping part 110C. As the loading pole base 107 moves over the bent part 110B, the loading pole base 107 becomes inclined with respect to the upper surface of the guide rail 110, and it becomes tighter for the loading pole base 107 to move over the bent part 110B. However, since the width of the guide groove 110A is set to $W_2$ for the bent part 110B as described before, the loading pole base 107 can smoothly move over the bent part 110B. The loading pole 104B moves to a position slightly exceeding the right side of the guide drum 11, without changing the height position thereof. In other words, the loading pole 104B moves in the vertical state thereof to the position slightly exceeding the right side of the guide drum 11, in the reference plane S, as shown in FIGS. 7 and 16. Then, the loading pole 104 is inclined while being displaced downwardly, and rotates by approximately 90° along the peripheral surface of the guide drum 11. In the plan view, the loading pole 104B undergoes a rotational displacement by an angle $\alpha_2$ as a whole, where the angle $\alpha_2$ is larger than the angle $\alpha_1$. Therefore, the loading pole 104B reaches a position on the opposite side with respect to the tape cassette 140, and is pushed against the stopper 113 by the action of the coil spring 122.

Accordingly, the tape 141 is wrapped around the peripheral surface of the guide drum 11 by an angular range which is slightly larger than 270°, which angular range is determined by the sloping poles 105 and 109.

When the loading pole base 107 moves obliquely downwards, the loading pole 104B leads the sloping pole 109. For this reason, the tape 141 is drawn out of the tape cassette 140 by the loading pole 104B, in a state where the displacement of the tape 141 is restricted in the width direction thereof by the fixed rings 104b and 104c. The tape 141 is then loaded into a predetermined tape path. It is possible to start a recording or reproducing operation immediately after the tape loading operation is completed.

The tape 141 making contact with the guide drum 11, separated from the guide drum 11 at the rear of the tape cassette 140, that is, at a position separated from the tape cassette 140 as much as possible. Thus, the length of the tape 141 in the tape path reaching the take-up reel from the position where the tape 141 separates from the guide drum 11, can be set to a long value. The sloping pole 109 assumes a position which is separated from the tape cassette 140 as much as possible, due to the combined effects of the relationship $R_2 > R_1$ and the relationship $\alpha_2 > \alpha_1$. Hence, even when the tape cassette 140 and the guide drum 11 are arranged close together, the reference length of the tape 141 reaching the audio and control head 73 from the position where the tape 141 separates from the guide drum 11, can be set to the standard value without the need to form a complex tape path so as to make up the reference length. The magnetic tape compatibility is maintained between the apparatus 10 and the standard type apparatus, also from the point of view of this reference length of the tape 141. The tape 141 is wrapped around the peripheral surface of the guide drum 11, in a state which is not symmetrical to the right and left sides viewed from the tape cassette 140.

The loading poles 104A and 104B start to move simultaneously, and move over mutually different distances with the respective different speeds, but reach the respective loading position at the same time. Accordingly, the wrapping of the tape 141 around the peripheral surface of the guide drum 11 is carried out smoothly at the same rate with respect to both the supply and take-up sides, and finishes with the same timing with respect to both the supply and take-up sides.

In the loading state, the supply loading pole 104A assumes the vertical state with respect to the chassis base 15, as in the case at the time of the unloading. On the other hand, the take-up loading pole 104B is inclined by a predetermined angle with respect to the chassis base 15 in the loading state. Further, in the loading state, the inclination angle of the sloping pole 109 located on the take-up side, is larger than the inclination angle at the time of the unloading.

Because the terminal part of the cam groove 49b of the lower cam 49 has a larger diameter, the movable gear 127 moves in the direction of the arrow B1 when the rotation of the lower cam 49 reaches the final rotating stage and exceeds the angle of 220° (pause mode position). The small diameter gear 127a separates from the cam gear 14 and meshes with the fixed rack 128. Moreover, the ring gears 114 and 116 are locked and are prevented from rotating in the reverse direction. In the pause mode and the recording or reproducing mode, the loading poles 104A and 104B are maintained in the state where the loading poles 104A and 104B are pushed against the respective stoppers 112 and 113.

The small diameter gear 127a separates from the cam gear 14 when the lower cam 49 rotates over 220° of the 240° over which the lower cam 49 rotates. For this reason, as the lower cam 49 rotates over the remaining 20° of the 240°, the cam gear 14 rotates independently without further rotating the ring gears 114 and 116. If the cam gear 14 rotates over this remaining 20° while rotating the ring gears 114 and 116, the cam gear 14 will rotate while further stretching the coil springs 118 and 122, and the load on the motor 12 will become considerably large. However, according to the present embodiment, the cam gear 14 rotates over the remaining 20° without rotating the ring gears 114 and 116. Therefore, the load on the motor 12 will not increase, and the apparatus 10 can smoothly assume the recording or reproducing mode. In addition, it is possible to smoothly switch the mode of the apparatus 10 to the pause mode according to the needs.

Next, description will be given with respect to the states of the members which determine the tape moving path at the time of the tape loading, and the functions of the members.

FIG. 17 shows the positions and sloping states of the poles in the periphery of the guide drum 11 in the tape loading state, viewed from the −Y direction in FIG. 13. In FIGS. 15, 16, and 17, a center line of the tape 141 is indicated by a line 131.

The tension pole 27, the tape guide 79, the full-width erasing head 78, the impedance roller 82, and the supply loading pole 104A shown in FIG. 13, each have a tape guiding surface which is vertical to the chassis base 15, that is, vertical to the tape moving plane within the tape cassette 140. The tape moving path from the tape cassette 140 to the supply loading pole 104A, lies on the reference plane S as shown in FIGS. 15 and 17.

The sloping pole 105 is inclined in the same direction as the inclination of the guide drum 11, by an angle (approximately 6°) which is equal to the inclination of the video tracks formed on the tape 141. Hence, the moving path (between points A and B) of the tape 141 from the sloping pole 105 towards the guide drum 11, is inclined downwardly. The rotary axis of the guide drum 11 is inclined with respect to an imaginary line which is perpendicular to the chassis base 15, by an angle $\beta$ (approximately 6°). With respect to the peripheral surface of the guide drum 11, the moving path (between points B and F passing through points C, D, and E) of the tape 141 gradually descends from the reference plane S as the tape 141 advances towards the tape moving direction. The sloping pole 109 on the exit side is inclined by 29° in the same direction as the inclination of the guide drum 11. Thus, the tape moving path (between points F and G) beyond the sloping pole 109 changes to an upwardly inclined path, and the tape 141 reaches the take-up loading pole 104B approximately horizontal to the chassis base 15. The height of the tape moving path at the take-up loading pole 104B, is lower than the height of the tape moving path in the vicinity of the supply loading pole 104A, by approximately 10 mm. The take-up loading pole 104B slopes in a predetermined direction by 25°. Accordingly, the tape moving path (between points G and H) beyond the take-up loading pole 104B is an upwardly inclined path with respect to the horizontal plane, so as to return the height position of the tape 141 back to the original height position. When the height of the tape moving path reaches the reference plane S and the height position of the tape 141 is returned to the original position at the point H, the tape 141 is guided by the rising and falling pole 85. The rising and falling pole 85 is inclined by approximately 20° with respect to the imaginary line which is perpendicular to the chassis base 15. As a result, the tape 141 is guided by the rising and falling pole 85, and assumes a state vertical to the chassis base 15 and along the reference plane S. The tape 141 thereafter reaches the tape cassette 140 by way of the tape guide 74, the audio erasing head 72, the audio and control head 73, the tape guide 74, and the capstan 22 and the pinch roller 21.

As described heretofore, the loading poles 104A and 104B restrict the height of the tape moving path, and the tape moving direction is changed by the sloping poles 105 and 109 and the rising and falling pole 85.

The take-up loading pole 104B and the sloping pole 109 on the exit side of the guide drum 11, are sloping by large angles with respect to the imaginary line which is vertical to the chassis base 15. The take-up loading pole 104B slopes by an angle of approximately 25° with respect to the imaginary line which is vertical to the chassis base 15, but the inclination angle of the take-up loading pole 104B with respect to an imaginary line which is perpendicular to the center line 131 of the tape 141 is 0°. Accordingly, no problems will occur when the roller 104a rotates as the tape 141 moves. In addition, the sloping pole 109 is inclined with respect to the imaginary line which is perpendicular to the chassis base 15 by an angle of approximately 29°. However, in the state where the tape loading is completed, the inclination angle of the sloping pole 109 with respect to the imaginary line which is perpendicular to the center line 131 of the tape 141 is under 20°, since the tape 141 approaches the sloping pole 109 from an oblique direction.

Generally, when the inclination angle of a pole which is provided for the purpose of changing the tape moving direction is large, the difference in the angles with which the tape enters and leaves this pole becomes large. As a result, the tape is bent greatly around the peripheral surface of the pole, the load on the moving tape increases, and problems are introduced from the point of view of stabilizing the tape movement. Moreover, the error in the inclination angle of the pole will greatly affect the angle with which the tape leaves the pole, and the pole must be positioned with a high precision.

However, according to the present invention, the inclination angle of the sloping pole 109 with respect to the imaginary line which is perpendicular to the center line 131 of the tape 141, is relatively small. Thus, the problems described above will not occur, and the tape 141 can smoothly move at the sloping pole 109. Further, at the time of the tape unloading, the loading pole 104B returns to the state where the loading pole 109 is vertical to the chassis base 15, and the inclination angle of the sloping pole 109 also decreases by approximately the same amount as the loading pole 104B. For this reason, the take-up loading pole 104B and the sloping pole 109 can relatively enter within the cutout 142b of the tape cassette 140, without any problems, when the tape cassette 140 is loaded into the apparatus 10.

The center line of the tape 141 makes contact with the peripheral surface of the guide drum 11, in a plane which is lower than the reference plane S. Hence, a distance h from the reference plane S to the upper surface of the guide drum 11, can be made smaller than the corresponding distance of the conventional guide drum. Accordingly, the guide drum 11 can assume a position where the upper surface of the guide drum 11 is lower than the lower surface of the open lid 143 of the loaded tape cassette 140. Therefore, as described before, tape cassette 140 can be loaded into a position extremely close to the guide drum 11, so that the open lid 143 overlaps with a part of the guide drum 11.

The signals are recorded on or reproduced from the tape 141, as the tape 141 moves in the tape path described before and makes contact with the peripheral surface of the guide drum 11. As may be seen from FIG. 15 in particular, the tape 141 moves in a state where the center line 131 thereof is on the reference plane S, as the tape 141 moves in the tape path which is between the tape cassette 140 and the guide drum 11 and determines the tape moving state around the periphery of the guide drum 11. Hence, the tape movement is smooth and accompanies no unwanted stress in the upstream side of the guide drum 11, and the tape 141 can move around the peripheral surface of the guide drum 11 with a uniform tension and with virtually no vibration. Therefore, it is possible to record or reproduce the signals on or from the tape 141 satisfactorily.

FIG. 18 shows operating states of parts in correspondence with rotational positions of the cam structure shown in FIG. 4. The distances over which the loading poles 104A and 104B must travel are respectively long, and for this reason, the loading poles 104A and 104B start to operate at an early stage and finish operating in a relatively late stage, as shown in FIG. 18(A). When the cam structure shown in FIG. 4 undergoes a rotation by approximately 210°, the loading poles 104A and 104B are stopped by the respective stoppers 112 and 113, and the loading poles 104A and 104B do not move in response to any further rotation of the cam structure. In other words, the mode of the apparatus 10 can be switched to the recording or reproducing mode or to the pause mode, in the state where the loading poles 104A and 104B are maintained in the respective final positions. The rising and falling pole 85 must rise after the take-up loading pole 104B passes thereby. Thus, the rising and falling pole 85 starts to rise in a relatively late stage, and assumes the raised position in a stage which is determined in relation to the operation of the head arm 70, as shown in FIG. 18(B). The head arm 70 starts to operate at a relatively late stage as shown in FIG. 18(C), so as to avoid collision with the take-up loading pole base 107. In addition, the operation of the head arm 70 is completed in a stage which is slightly later than that of the rising and falling pole 85, and the rising and falling pole 85 in the raised position is further guided to the final position by the stopper 75. In the stop mode, the pinch roller 21 is positioned to the rear of the head arm 70. Hence, as shown in FIG. 18(D), the pinch roller 21 starts to operate in a stage which is later than that of the head arm 70, and completes the operation at a latest stage since the pinch roller 21 simply needs to press against the capstan 22 upon the completion of the tape loading. The moving locus of the tension arm 26 intersects with the moving locus of the supply loading pole 104A, and for this reason, the tension arm 26 is designed to start operating at a late stage as shown in FIG. 18(E). The tape 141 is recovered within the tape cassette 140 by the mechanisms in the supply side. Accordingly, the take-up gear 46 is maintained in the operating position until the completion of the tape unloading operation as shown in FIG. 18(F), but the take-up gear 46 becomes temporarily inoperative in the pause position (position rotated by 220°).

When the apparatus 10 is operated to assume the pause mode in the recording or reproducing mode thereof, the loading motor 12 rotates in the reverse direction. Further, the cam gear 14, the lower cam 49, the head cam 88, and the upper cam 89 each rotate counterclockwise by 20° from the position rotated clockwise by 240°. In this state, the pinch roller 21 is separated from the capstan 22 as shown in FIG. 18(C), and as shown in FIG. 18(F), the take-up gear 46 temporarily disengages from the gears 42b and 41b so as to stop the moving tape 141. However, the other remaining parts remain in the same states as those at the time of the recording or reproduction.

On the other hand, when the apparatus 10 is operated to assume the stop mode in the recording or reproducing mode thereof, the loading motor 12 rotates in the reverse direction. The cam gear 14, the lower cam 49, the head cam 88, and the upper cam 89 each rotate counterclockwise by 240° from the position rotated clockwise by 240°. Each of the parts return to the respective original states at the time of the stop mode, by operating in a sequence in reverse to that shown in FIG. 18. The take-up gear 46 is kept in mesh with the gears 42b and 41b, while the cam structure rotates counterclockwise over 220° out of the 240°. When the apparatus 10 is operated to assume the stop mode while the can structure rotates counterclockwise over this 220°, the capstan motor 33 is rotated in the reverse direction by a motor control circuit (not shown). Hence, in this state, the take-up gear 46 meshes with the lower gear 43b and rotates the supply reel disc 31b counterclockwise by way of a friction felt (not shown) and the upper gear 43a. Accordingly, the tape 141 which is drawn out of the tape cassette 140 by the loading poles 104A and 104B and is in the tape moving path described before, is taken up by the supply reel hub 145 and is recovered within the tape cassette 140. The height of the loading pole 104B changes and becomes inclined as the tape unloading operation progresses. Therefore, compared to the case where the loading pole moves horizontally in the vertical state thereof, the tape will more easily disengage from the loading pole. That is, the tape will disengage from the loading pole even by a slight slack in the tape However, according to the present embodiment, the tape take-up operation at the time when the tape 141 is recovered within the tape cassette 140, is carried out by way of a slip mechanism which employs the friction felt. As a result, a tension corresponding to the slip torque continues to be applied to the tape 141 as the tape 141 is recovered within the tape cassette 140, and the tape 141 will not disengage from the loading pole 104B as the loading pole 104B returns to the original position. In other words, the tape unloading is carried out in the state where the tape 141 continues to be engaged with the loading pole 104B. Further, the present invention is not limited to these embodiments, but various variations and modifications may be made without departing from the scope of the present invention.

What is claimed is:
1. A helical scan type recording and/or reproducing apparatus comprising:
 a cassette loading part into which a tape cassette accommodating therein a tape is loaded;
 a guide drum having recording and/or reproducing heads for recording and/or reproducing signals on and/or from the tape which is drawn out of said tape cassette loaded in said cassette loading part, the drawn tape being spirally wrapped around said tape guide drum and traveling along a tape traveling path which comprises an upstream tape path part extending from said tape cassette to a first point where said tape begins to make contact with a peripheral surface of said tape guiding drum, a spiral tape path part extending from said first point to a second point where said tape terminates a contact with the peripheral surface of said tape guide drum, and a downstream tape path part extending from said second point to sait tape cassette;
 first loading means for drawing the tape out of said tape cassette loaded in said cassette loading part during a tape loading operation by moving from an unloading position to a loading completion position which is located on said upstream tape path part, without changing a height position thereof which corresponds to a height position of a reference plane which is determined by a center line of the tape within said tape cassette;
 second loading means for drawing the tape out of said tape cassette loaded in said cassette loading part during the tape loading operation by moving from an unloading position to a loading completion position which is located on said downstream tape path part and is in a plane lower than the reference plane, said first and second loading means in the respective loading completion positions guiding the tape so that the height of the center line of the tape gradually lowers between said first and second loading means in the respective loading completion positions, and said spiral tape path part extends around the peripheral surface of said tape guide drum over an angle which is substantially equal to or larger than 270°;

driving means for driving each of said first and second loading means to move from the unloading position to the loading completion position during the tape loading operation; and tape guiding means arranged on a downstream side of said second tape loading mean, for making contact with the tape which is drawn out of said tape cassette by said second loading means and for guiding the tape which has been guided by said second loading means in the loading completion position so as to change a traveling direction of the tape so that the center line of the tape has the same height position as said reference plane in the downstream side of said tape guiding means, said tape guiding means comprising a guide pole for guiding the tape in the downstream side of said second tape loading means, said guide pole being fallen when said first and second loading means are in the respective unloading positions, and said guide pole being driven by said driving means during the tape loading operation so that said guide pole rises to make contact with the tape from the same side of the tape as the second loading means and to guide the tape in the downstream side of the second loading means.

2. A recording and/or reproducing apparatus as claimed in claim 1 in which said first loading means comprises a first tape loading pole assembly for intercepting and guiding the tape, and first moving means for moving said first tape loading pole assembly generally in an arcuate path along one peripheral side of said guide drum, said second tape loading means comprises a second tape loading pole assembly for intercepting and guiding the tape, and second moving means for moving said second tape loading pole assembly generally in an arcuate path along another 1 peripheral side of said guide drum on the opposite side from said one peripheral side, and said second moving means moves said second tape loading pole assembly along the generally arcuate path which has a diameter greater than a diameter of the generally arcuate path along which said first tape loading pole assembly moves, over a rotating angle greater than a rotating angle over which said first tape loading pole assembly moves.

3. A recording and/or reproducing apparatus as claimed in claim 2 which further comprises control means for controlling said first and second moving means so that said first and second tape loading pole assemblies start to move simultaneously and complete the respective movements simultaneously.

4. A recording and/or reproducing apparatus as claimed in claim 3 in which said first moving means comprises a first ring gear member which rotates clockwise so as to move said first tape loading pole assembly to a loading completion position, said second moving means comprises a second ring gear member which rotates counterclockwise so as to move said second tape loading pole assembly to a loading completion position, and said control means couples said first and second ring gear members so that said first and second ring gear members rotate in mutually opposite directions at different moving speeds so that a ratio between the moving speeds of said first and second ring gear members corresponds to a ratio between distances over which said first and second tape loading pole assemblies move.

5. A recording and/or reproducing apparatus as claimed in claim 1 in which said second tape loading means comprises a second tape loading pole assembly for intercepting and guiding the tape, a guide member disposed along the periphery of said guide drum, for guiding said second tape loading pole assembly in three dimensions, said guide member comprising a horizontal surface part located nearer to the unloading position, a sloping surface part located nearer to the loading position, and a bent surface part connecting said horizontal and sloping surface parts, and second moving means for moving said second tape loading pole assembly along said guide member, and said second tape loading pole assembly moves under guidance of said horizontal, bent, and sloping surface parts so that said second tape loading pole assembly is positioned on said sloping surface part in a loading position thereof, said second tape loading pole assembly at the loading position having a height position lower than a height position at the unloading position thereof and being inclined by a predetermined angle with respect to an imaginary line which is perpendicular to the tape moving plane within said tape cassette.

6. A recording and/or reproducing apparatus as claimed in claim 5 in which said guide member comprises a guide groove in said horizontal, bent, and sloping surface parts, for guiding said second tape loading pole assembly in a state where at least a pair of projections located on a bottom surface of said second tape loading pole assembly are fitted into said guide groove, and said guide groove in said bent surface part has a width greater than a width in said horizontal and sloping surface parts so that said second tape loading pole assembly can move smoothly over said horizontal, bent, and sloping surface parts.

7. A recording and/or reproducing apparatus as claimed in claim 5 in which said second moving means comprises a vertical pin member which moves in a horizontal plane, said pin member penetrates through a hole formed in a pole base of said second tape loading pole assembly, and said hole in the pole base has a diameter greater than a diameter of said pin member.

8. A recording and/or reproducing apparatus as claimed in claim 5 in which said second tape loading pole assembly comprises a first pole having rings for restricting a displacement of the tape in a width direction of the tape, and a second pole having no rings, and said guide member guides said second tape loading pole assembly so that a position of said first pole leads a position of said second pole as the tape is wrapped around the peripheral surface of said guide drum.

9. A recording and/or reproducing apparatus as claimed in claim 1 in which said driving means comprises a rotary body for rotating during the tape loading operation, and said tape guiding means comprises first means displaced due to a rotation of said rotary body for causing said guide pole to rise, second means for locking said guide pole which has risen at a locking position of said second means, said second means being displaced due to the rotation of said rotary body to said locking position from a receded position, and third means driven by said rotary body for displacing said first and second means.

10. A recording and/or reproducing apparatus as claimed in claim 9 in which said third means displace said first means when said second loading means enters into an operating stage in which said second loading means moves obliquely downwards.

* * * * *